US005974659A

United States Patent [19]

Kesinger

[11] Patent Number: 5,974,659

[45] Date of Patent: Nov. 2, 1999

[54] MACHINE FOR REPETITIVELY APPLYING CONNECTORS ON CABLE ENDS TO FORM ROUND CONNECTIONS

[76] Inventor: Donald A. Kesinger, P.O. Box 396, Morrison, Colo. 80465

[21] Appl. No.: 08/859,374

[22] Filed: May 20, 1997

Related U.S. Application Data

[60] Provisional application No. 60/018,165, May 23, 1996.

[51] Int. Cl.[6] .......... B23P 19/00

[52] U.S. Cl. .......... 29/753; 29/861; 29/863; 29/751; 29/748

[58] Field of Search .......... 29/748, 751, 753, 29/861, 863

[56] References Cited

U.S. PATENT DOCUMENTS

| | | | |
|---|---|---|---|
| 3,056,445 | 10/1962 | Wise | 153/1 |
| 3,325,885 | 6/1967 | Ziegler, Jr. et al. | 29/203 |
| 3,417,599 | 12/1968 | Burns | 72/410 |
| 3,754,323 | 8/1973 | Pence et al. | 29/628 |
| 3,911,717 | 10/1975 | Yuda | 72/331 |
| 4,043,174 | 8/1977 | Paowo | 72/412 |
| 4,179,782 | 12/1979 | Forman et al. | 29/268 |
| 4,211,001 | 7/1980 | White et al. | 29/747 |
| 4,292,833 | 10/1981 | Lapp | 72/416 |
| 4,354,618 | 10/1982 | Weyandt | 221/186 |
| 4,398,337 | 8/1983 | Yamaguti et al. | 29/564.6 |
| 4,489,476 | 12/1984 | Over et al. | 29/564.4 |
| 4,663,838 | 5/1987 | Dewey et al. | 29/751 |
| 4,774,762 | 10/1988 | Gobeil | 29/861 |
| 4,790,068 | 12/1988 | Sato | 29/761 |
| 4,794,780 | 1/1989 | Bartenfeld | 72/410 |
| 4,835,855 | 6/1989 | Eaton et al. | 29/863 |
| 4,885,928 | 12/1989 | Davis et al. | 72/410 |
| 4,890,384 | 1/1990 | Shaffer | 29/863 |
| 4,953,384 | 9/1990 | Baillet et al. | 72/410 |
| 5,040,288 | 8/1991 | Nilsson | 29/751 |
| 5,054,191 | 10/1991 | Schule | 29/753 |
| 5,094,097 | 3/1992 | Tooth et al. | 72/410 |
| 5,138,864 | 8/1992 | Tarpill | 72/410 |
| 5,211,049 | 5/1993 | Lucas | 72/410 |
| 5,392,508 | 2/1995 | Holliday et al. | 29/751 |
| 5,402,566 | 4/1995 | Long | 29/863 |
| 5,502,996 | 4/1996 | Strong et al. | 72/430 |
| 5,511,307 | 4/1996 | Reiersgaard et al. | 29/863 |

FOREIGN PATENT DOCUMENTS

| | | |
|---|---|---|
| 3408683 | 3/1984 | Germany . |
| 1285695 | 8/1972 | United Kingdom . |

*Primary Examiner*—Lee Young
*Assistant Examiner*—Kevin G. Vereene
*Attorney, Agent, or Firm*—Flanagan & Flanagan; John R. Flanagan; John K. Flanagan

[57] ABSTRACT

A cable connection crimping machine for applying female sleeve ends of connectors over male ends of cables in repetitive one at a time manner includes a connector feeder mechanism operable to collect and feed connectors in a row to a transfer location, a connector transfer mechanism operable in a repetitive one at a time manner to receive connectors at the transfer location and arrange connectors with their sleeve ends projecting forwardly in alignment with ends of cables that are inserted in a repetitive one at a time manner to an insertion location, a cable transfer mechanism operable in a repetitive one at a time manner to grip and advance cable ends into the sleeve ends of the connectors, and a crimper die mechanism operable in a repetitive one at a time manner to crimp sleeve ends of the connectors onto the inserted cable ends to form substantially uniform round sealed connections with the cable ends. The crimper die mechanism and cable transfer mechanism are further operable in a repetitive one at a time manner to release and eject the cable ends with the connector attached thereon from the machine.

23 Claims, 10 Drawing Sheets

FIG. 2
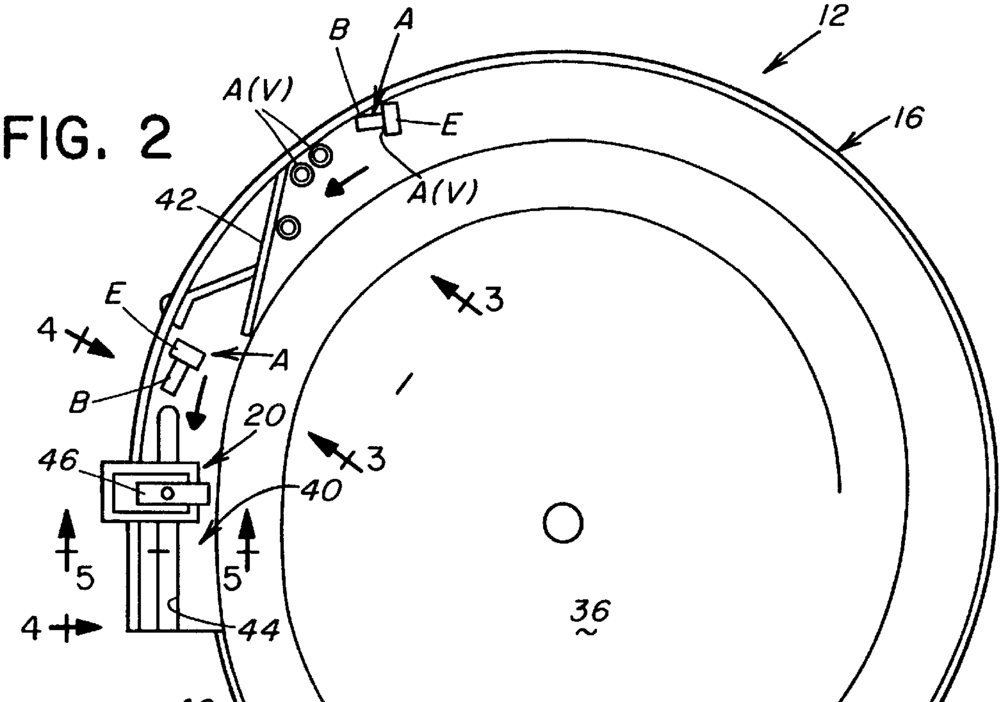
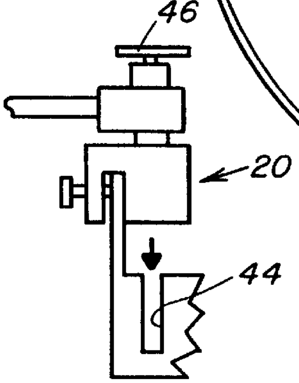
FIG. 5
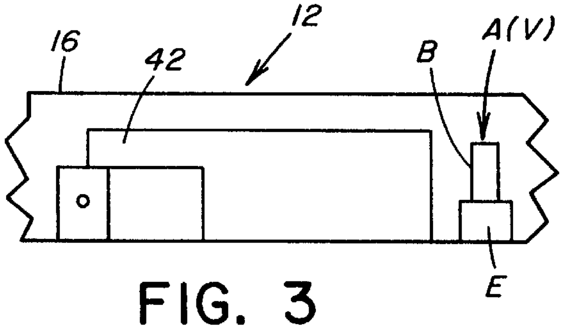
FIG. 3
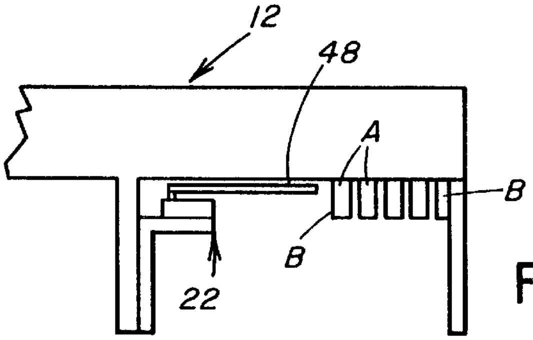
FIG. 4

MACHINE FOR REPETITIVELY APPLYING CONNECTORS ON CABLE ENDS TO FORM ROUND CONNECTIONS

This application claims the benefit of U.S. provisional application No. 60/018,165, filed May 23, 1996.

BACKGROUND OF THE INVENTION

1. Field of the Invention

The present invention generally relates to cable connection crimping equipment and, more particularly, is concerned with a cable connection crimping machine operable in a repetitive one at a time manner to bring connectors into alignment with ends of cables, such as coaxial cables, apply and crimp connectors onto cable ends to form substantially uniformly sealed round connections with the cable ends, and eject cable ends with connectors thereon from the machine.

2. Description of the Prior Art

For many years it had been accepted practice in the television industry to employ a hand-held crimping tool to attach a standard fitting onto the end of a coaxial cable which could then be threadably connected into a mated fitting or terminal on a television set. The crimping tool was designed to crimp or reduce the size of a connector sleeve on the cable side of the fitting into a generally hexagonal configuration in attaching the fitting to the end of the cable. A major problem with the hexagonal crimp, however, was that it did not completely seal off the end of the cable and permitted air and moisture to enter by way of the cable end which may affect the quality of the television picture and gradually erode the cable itself.

One solution to the aforementioned problem was proposed in U.S. Pat. No. 5,138,864 to Tarpill wherein a crimping tool was disclosed that could compress a fitting into a generally circular configuration onto the cable end by applying a radially directed force to the fitting that uniformity and simultaneously reduced in diameter the axial length of the connector sleeve of the fitting. Other prior art patents of interest are U.S. Pat. No. 3,417,599 to Burns, U.S. Pat. No. 4,043,174 to Paolino, U.S. Pat. No. 4,266,219 to Grundfest, U.S. Pat. No. 4,292,833 to Lapp, U.S. Pat. No. 4,790,068 to Sato, U.S. Pat. No. 4,794,780 to Battenfeld, U.S. Pat. No. 4,885,928 to Davis et al and U.S. Pat. No. 4,953,384 to Baillet et al.

More recently, another solution to the aforementioned problem has been proposed in U.S. Pat. No. 5,392,508 to Holliday et al wherein a crimping tool was disclosed that could compress the connector sleeve of the fitting into a generally circular configuration onto the cable end by applying an axially directed force, as opposed to direct radial compression, to the fitting that uniformly but progressively reduced in diameter the axial length of the connector sleeve. In that way, the die members used in the crimping operation having tapered die surfaces of circular configuration may remain stationary during the crimping operation and can be formed to extremely close tolerances while achieving the necessary crimping force to assure uniform sealed engagement of the with the cable end.

The approach of the Holliday et al crimping tool has experienced significant commercial acceptance in the industry as demonstrated by its growing share of the commercial market for such tools. However, the implementation of the Holliday et al approach is as a hand-held tool primarily used by field service workers making cable connections in the field as opposed to making such connections at cable manufacturing and/or assembling facilities. The inventor herein (who is a co-inventor of the Holliday et al crimping tool) has perceived that a different approach is needed to make cable connections that are still comparable in quality to those made by the Holliday et al tool but made on a high speed automated basis in cable manufacturing and/or assembling facilities. Prior art patents of interest are U.S. Pat. No. 3,056,445 to Wise, U.S. Pat. No. 3,754,323 to Pence et al, U.S. Pat. No. 3,911,717 to Yuda, U.S. Pat. No. 4,398,337 to Yamaguti t al, U.S. Pat. No. 4,489,476 to Over et al, U.S. Pat. No. 4,774,762 to Gobeil, U.S. Pat. No. 4,835,855 to Eaton et al, 4,890,384 to Shaffer, U.S. Pat. No. 5,054,191 to Schule, U.S. Pat. No. 5,402,566 to Long and U.S. Pat. No. 5,502,996 to Strong et al. None of these devices appear to provide a desired solution to the problem of how to automate cable connections.

Consequently, a need still exists for a machine for making crimped cable connections on a high speed automated basis adapted for use on cable assembly lines.

SUMMARY OF THE INVENTION

The present invention provides a cable connection crimping machine designed to satisfy the aforementioned need. The crimping machine of the present invention, on a one at a time repetitive basis, applies connectors to cable ends so as to form substantially uniformly sealed round connections. The crimping machine functions in a manner that minimizes manual labor inputs and maximizes productivity in the application of connectors to cables, especially coaxial cables. All that an operator has to do is push the cable end into a infeed hole provided in the machine and the machine then automatically places a connector on the cable end and crimps it into a round symmetrical configuration which substantially prevents ingress of water and other contaminants into the cable end as well as ingress and egress of all electrical signals.

Accordingly, the present invention is directed to a cable connection crimping machine for applying female sleeve ends of connectors over male ends of cables. The crimping machine comprises: (a) a connector feeder mechanism operable to collect and feed connectors in a row to a transfer location, each connector having a female sleeve end insertable over a male end of a cable; (b) a connector transfer mechanism disposed adjacent to the feeder mechanism and being operable in a repetitive one at a time manner to receive connectors at the transfer location and transfer the connectors with sleeve ends projecting forwardly into alignment with male ends of cables inserted in a repetitive one at a time manner to an insertion location; (c) a cable transfer mechanism disposed adjacent to the connector transfer mechanism and being operable in a repetitive one at a time manner to grip cables and advance cable ends toward and insert cable ends into sleeve ends of the connectors; and (d) a crimper die mechanism operable in a repetitive one at a time manner to crimp sleeve ends of the connectors onto the inserted cable ends to form substantially uniform round connections with the cable ends. Also, the crimper die mechanism and cable transfer mechanism are operable in a repetitive one at a time manner to release and eject cable ends with connectors crimped thereon from the crimper die mechanism and cable transfer mechanism.

The present invention is also directed to a connector and cable end transfer and crimper apparatus for applying female sleeve ends of connectors over male ends of cables. The transfer and crimper apparatus comprises: (a) a connector transfer mechanism adjacent operable in a repetitive one at a time manner to receive connectors and transfer the connectors with sleeve ends projecting forwardly into alignment with male ends of cables inserted in a repetitive one at a time manner to an insertion location; (b) a cable transfer mechanism disposed adjacent to the connector transfer mechanism and being operable in a repetitive one at a time manner to grip cables and advance cable ends toward and insert cable ends into sleeve ends of the connectors; and (c) a crimper die mechanism operable in a repetitive one at a time manner to crimp sleeve ends of the connectors onto the inserted cable ends to form substantially uniform round connections with the cable ends. Also, the crimper die mechanism and cable transfer mechanism are operable in a repetitive one at a time manner to release and eject cable ends with connectors crimped thereon from the crimper die mechanism and cable transfer mechanism.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is a top plan view of a feed bowl of a connector feeder mechanism of the crimping machine of FIG. 1.

FIG. 3 is a fragmentary side elevational view of the feed bowl as seen along line 3—3 of FIG. 2.

FIG. 4 is a fragmentary side elevational view of the feed bowl as seen along line 4—4 of FIG. 2.

FIG. 5 is a cross sectional view of the feed bowl taken along line 5—5 of FIG. 2.

DETAILED DESCRIPTION OF THE PREFERRED EMBODIMENTS

Cable Connection Crimping Machine—Overview

Figures 1, 6, 7, 8:
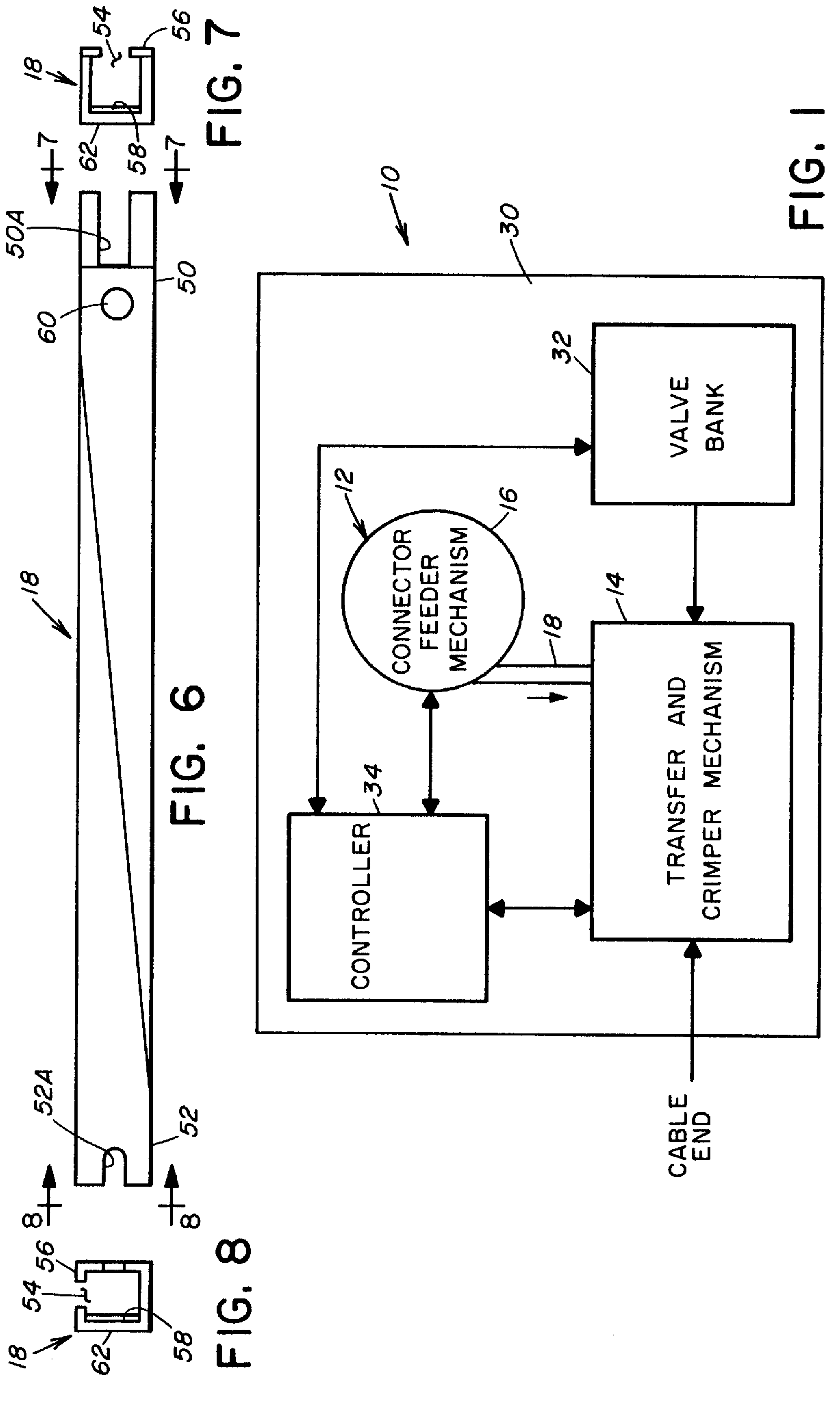
FIG. 1 is a functional block diagram of the cable connection crimping machine of the present invention.
FIG. 6 is a top plan view of a feed slide of the connector feeder mechanism of the crimping machine of FIG. 1.
FIG. 7 is an end elevational view of an infeed end of the feed slide as seen along line 7—7 of FIG. 6.
FIG. 8 is an end elevational view of a discharge end of the feed slide as seen along line 8—8 of FIG. 6.

Referring to the drawings and particularly to FIG. 1, there is illustrated a functional block diagram of the general components making up a cable connection crimping machine, generally designated 10. The crimping machine 10 is operable in a repetitive one at a time manner to feed connectors A having female sleeve ends B with longitudinal axes L into alignment with cables C, such as coaxial cables, having male ends D which are inserted one at a time into the machine 10. The crimping machine 10 is further operable in a repetitive one at a time manner to apply and then crimp female sleeve ends B of the connectors A onto the male ends D of the cables C to form uniform round sealed connections therebetween, and then eject the cable ends with the connectors A attached thereon from the machine 10.

The crimping machine 10 of the present invention basically includes a connector feeder mechanism 12 and a connector and cable end transfer and crimper apparatus 14. As shown in FIGS. 2–8, in an exemplary embodiment the feeder mechanism 12 includes a vibratory feed bowl 16, a tubular feed slide 18, a pressurized fluid jet 20 and a sensor element 22. The feeder mechanism 14 is operable to collect connectors A into a desired feed orientation and then feed the connectors A in a row in a repetitive one at a time manner to a transfer location in the transfer and crimper apparatus 14. As shown in FIGS. 9–18, the transfer and crimper apparatus 14 of the present invention includes a connector transfer mechanism 24, a cable transfer mechanism 26, and a crimper die mechanism 28. The transfer and crimper apparatus 14 is operable in a repetitive one at a time manner to receive connectors A and ends D of cables C, transfer and insert male cable ends D into female sleeve ends B of the connectors A, crimp female sleeve ends B of the connectors A over and around the male cable ends D and eject the crimped cables C therefrom. The crimping machine 10 also has a frame 30 which supports the feeder mechanism 12 and the transfer and crimper mechanism 14 of the machine 10.

The crimping machine 10 may also include any suitable means for initiating and controlling the operation of the feeder mechanism 12 and transfer and crimper apparatus 14. One example of such means functionally depicted in FIG. 1 is a suitable valve bank 32 and a suitable controller 34, such as a programmable logic array (PLA). The valve bank 32 interfaces with the transfer and crimper apparatus 14 to actuate in the desired sequence the operations of the various components thereof that are described hereinafter. The controller 34 interfaces with the feeder mechanism 12, transfer and crimper apparatus 14 and the valve bank 32 to establish bi-directional communication therewith in order to regulate and control the various operations thereof. It is not believed necessary to provide a detailed description of an implementation of the valve bank 32 and controller 34 in order for one of ordinary skill in this art to gain a thorough and complete understanding of the crimping machine 10 of the present invention defined in the claims. It is believed to be within the capability of one of ordinary skill in this art to arrive at a suitable implementation of the means for initiating and controlling the operation of the feeder mechanism 12 and transfer and crimper apparatus 14 of the crimping machine 10 without having to perform undue experimentation in order to do so.

Connector Feeder Mechanism

Referring to FIGS. 2–8, there is illustrated in detail the connector feeder mechanism 12 of the crimping machine 10. The feeder mechanism 12 employs the vibratory feed bowl 16 to collect and sort connectors A and the feed slide 18 to feed connectors A in a row to a transfer location in the connector transfer mechanism 24.

More particularly, the vibratory feed bowl 16 has a central portion 36, a peripheral ramp portion 38, and discharge track 40. The connectors A are placed in the central portion 36 of the bowl 16 and upon application of vibratory motion to the bowl 16 in a manner well known in the art the connectors A move up the peripheral ramp portion 38. The peripheral ramp portion 38 thus receives connectors A from the central portion 36 of the bowl 16 and will sort them into a desired orientation. Specifically, the connectors A advance up the peripheral ramp portion 38 and pass a fence-like sorter structure 42 mounted thereon. The sorter structure 42 is arranged across the path of advancing connectors A such that it will push from the peripheral ramp portion 38 back into the central portion 36 of the bowl 16 any connectors A(V) standing in an upright position while allowing any connectors A(P) lying in a prone position to pass under the sorter structure 42.

The discharge track 40 on the bowl 16 is aligned with and extends from the peripheral ramp portion 38 thereof to receive the connectors A(P) lying in the desired prone orientation and arrange the connectors in a feed orientation with their sleeve ends B extending downward and longitudinal axes L extending substantially vertically for discharging the connectors A in a single file fashion in the feed orientation from the vibratory feed bowl 16. More particularly, as the pronely-positioned connectors A reach the discharge track 40 their sleeve ends B fall through a slot 44 formed in the track 40 and thereby assume the vertical orientation as seen in FIGS. 4 and 5.

The pressurized fluid jet 20 of the feeder mechanism 12 which is disposed above the discharge track 40 is operable to impinge a downward pressurized flow of fluid, such as air, on the connectors A received on the discharge track 40 so as to ensure that their sleeve ends B fall into the slot 44 and their longitudinal axes L assume the substantially vertical feed orientation in the disharge track 40. The jet 20 has a knob 46 connected to a valve therein for turning by an operator to adjust the air flow to a desired velocity directed downwardly toward the slot 44.

The sensor element 22 of the feeder mechanism 12 is disposed adjacent to the discharge track 40 of the vibratory feed bowl 16 for sensing an accumulation of a predetermined number of the connectors A in the slot 44 of the discharge track 40. The sensor element 22 has a pivotal arm 48 normally disposed inwardly across the path of the connectors A. So long as the pivotal arm 48 is disposed at the inward position, the vibratory feed bowl 16 remains turned on. Once the pivotal arm 48 moves outwardly because of the accumulation of the predetermined number of connectors A along the discharge track 40, the controller 34 responds by shutting off the vibratory energy applied to the bowl 16 so as to terminate receipt of any additional connectors A by the discharge track 40 from the peripheral ramp portion 38 of the bowl 16 until the number of connectors in the discharge track 40 falls below a predetermined number thereof. The temporary shutoff of the vibratory feed bowl 16 prevents an over accumulation of connectors A which can result in jamming and inadvertent mating of the connectors together requiring the operator to then have to separate the connectors.

The tubular feed slide 18 of the feeder mechanism 12 has an upper infeed end 50 (also seen in FIG. 18) pivotally coupled adjacent to the discharge track 40 and a lower discharge end 52 pivotally coupled to the connector transfer mechanism 24. The upper infeed end 50 and lower discharge end 52 of the feed slide 18 have notches 50A, 52A which interfit with pins mounted to the discharge track 40 and transfer mechanism 24 to permit concurrent pivotal and sliding movements of the feed slide 18 relative to the connector transfer mechanism 24 when the latter is moved toward and away from cable ends D. The lower discharge end 52 is disposed at a level spaced below that of the upper infeed end 50 providing the feed slide 18 in an inclined orientation which adapts connectors A received at the upper infeed end 50 to slidably move down the feed slide 18 due to the influence of the force of gravity only. The tubular feed slide 18 is axially twisted through about ninety degrees so as to define a slide path adapted to rotate the connectors A through substantially ninety degrees as they slide down the tubular feed slide 18 from the upper infeed end 48 to the lower discharge end 52 thereof. Thus, the connectors A which start from the discharge track 40 in the aforementioned feed orientation arrive at the transfer location in the connector transfer mechanism 24 in a crimp orientation in which their sleeve ends B project forwardly toward the cable ends D and their longitudinal axes L extend in substantially horizontal orientation.

To keep the connectors A oriented properly with their sleeve ends B extending through an elongated gap or slot 54 defined along a front wall 56 of the hollow feed slide 18, an elongated restrictor strip 58 of low friction material, such as ten mil Mylar, is arranged in an untwisted orientation within the tubular feed slide 18 with an upper end of the restrictor strip 58 attached at 60 to a solid back wall 62 opposite the slotted front wall 56 at the infeed end 50 of the feed slide 18. The restrictor strip 58 engages the enlarged rear ends E of the connectors A so to prevent connectors A from turning within the hollow feed slide 18 and blocking the slide path. The connectors A will push the restrictor strip 58 toward the back wall 56 as they slide past it.

Connector Transfer Mechanism

Referring to FIGS. 9–13, there is illustrated in detail the connector transfer mechanism 24 of the transfer and crimper apparatus 14 of the crimping machine 10. The connector transfer mechanism 24 is disposed adjacent to the discharge end of the feed slide 18 of the feeder mechanism 12 and is operable in a repetitive one at a time manner to receive connectors A at the transfer location and advance the connectors A in a crimp orientation with their sleeve ends B projecting toward and in alignment with male ends D of cables C which are inserted by the operator in a repetitive one at a time manner into the machine 10 to an insertion location therein.

The connector transfer mechanism 24 includes a cylindrical body 64 having an interior feed chamber 66 extending therethrough between front and rear ends 64A, 64B of the body 64 and a side entrance 68 extending into the body 64 from an exterior surface 64C thereof to the interior feed chamber 66. The lower discharge end 52 of the tubular feed slide 18 is disposed in the side entrance 68 of the body for discharging connectors A in a repetitive one at a time manner to the transfer location within the interior feed chamber 66 of the body 64. The connector tranfer mechanism 24 further includes a chuck means 70 arranged on the body 64 for engaging connectors A in the interior feed chamber 66 in a repetitive one at a time manner.

Figure 13:
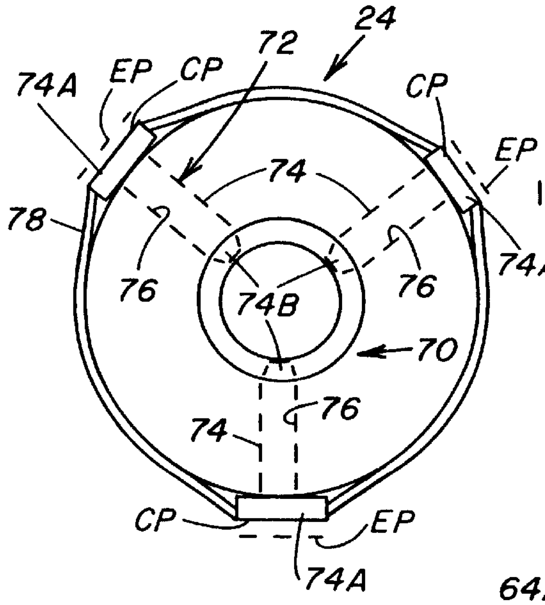
FIG. 13 is a front end elevational view of the connector transfer mechanism as seen along line 13—13 of FIG. 12.
Figure 12:
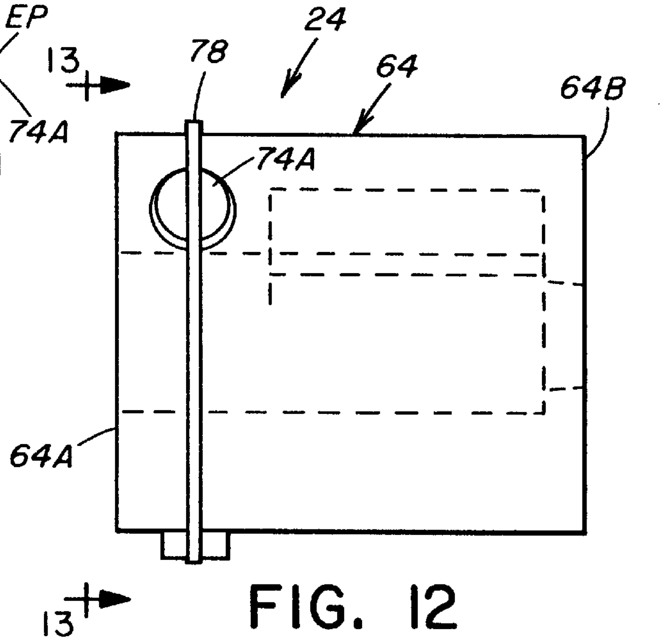
FIG. 12 is an enlarged side elevational view of the connector transfer mechanism as seen along line 12—12 of FIG. 9.

The chuck means 70 has a gripping portion 72 movable between contracted and expanded positions CP, EP, as shown in solid and dashed line forms in FIG. 13, relative to each of the connectors A to center and hold the connector A within the interior feed chamber 66 of the body 64 in the crimp orientation aligned with the cable end D in preparation to being crimped to the cable end and to release the connector A from the interior feed chamber 66 after being crimped over the cable end D. In the first embodiment depicted in FIGS. 9–13, the chuck means 70 includes a plurality of fingers 74 slidably mounted through radial passageways 76 in the body 64 and radially aligned with the interior feed chamber 66 of the body 64, and a yieldable spring 78 extending circumferentially about the cylindrical body 64 that engages outer ends 74A of the fingers 74. The spring 78 is stretchable to permit radial movement of the fingers 74 away from the interior feed chamber 66 to the expanded position EP and to urge radial movement of the fingers 74 toward the interior feed chamber 66 of the body 64 to the contracted position CP such that inner ends 74B of the fingers 74 will correspondingly release and engage each of the connectors A transferred thereto. An initial rearward movement of the body 64 of the connector transfer mechanism 24 toward an anvil portion of the crimper die mechanism 28 from an initial rest position, as shown in full line form in FIG. 9, to an initial displaced position, as indicated by a dashed line IP in FIG. 9, engages the connector A with the anvil portion and pushes and transfers the connector A forwardly within the feed chamber 66 into the grip of the inner ends 74B of the fingers 74 in preparation for the crimping of the sleeve end to the cable end. Then, further movement of the body 64 of the connector transfer mechanism 24 toward the anvil portion to a final displaced position, as indicated by a dashed line FP in FIG. 9, after completion of the crimping operation, pushes the connector A forwardly from the interior feed chamber 66 past the inner ends 74B of the fingers 74 which are slightly sloping, releasing the connector A from the mechanism 24. The body 64 of the connector transfer mechanism 24 is supported and carried by and thus moves with a die jaw assembly of the crimper die mechanism 28, as will be described below.

Cable Transfer Mechanism

Referring to FIGS. 9 and 14–16, there is illustrated in detail the cable transfer mechanism 26 of the transfer and crimper apparatus 14 of the crimping machine 10. The cable transfer mechanism 26 is disposed adjacent to the connector transfer mechanism 24 and is operable in a repetitive one at a time manner to grip the ends D of cables C and advance and insert cable ends D into sleeve ends B of the connectors A.

The cable transfer mechanism 26 includes a cable end guide and gripper assembly 80 and a cable end grip and glide assembly 82 disposed adjacent to but forwardly of the connector transfer mechanism 24. The assemblies 80, 82 cooperate together to grip cable ends D and advance and insert the cable ends D in a repetitive one at a time manner into sleeve ends B of the connectors A.

Figure 9:
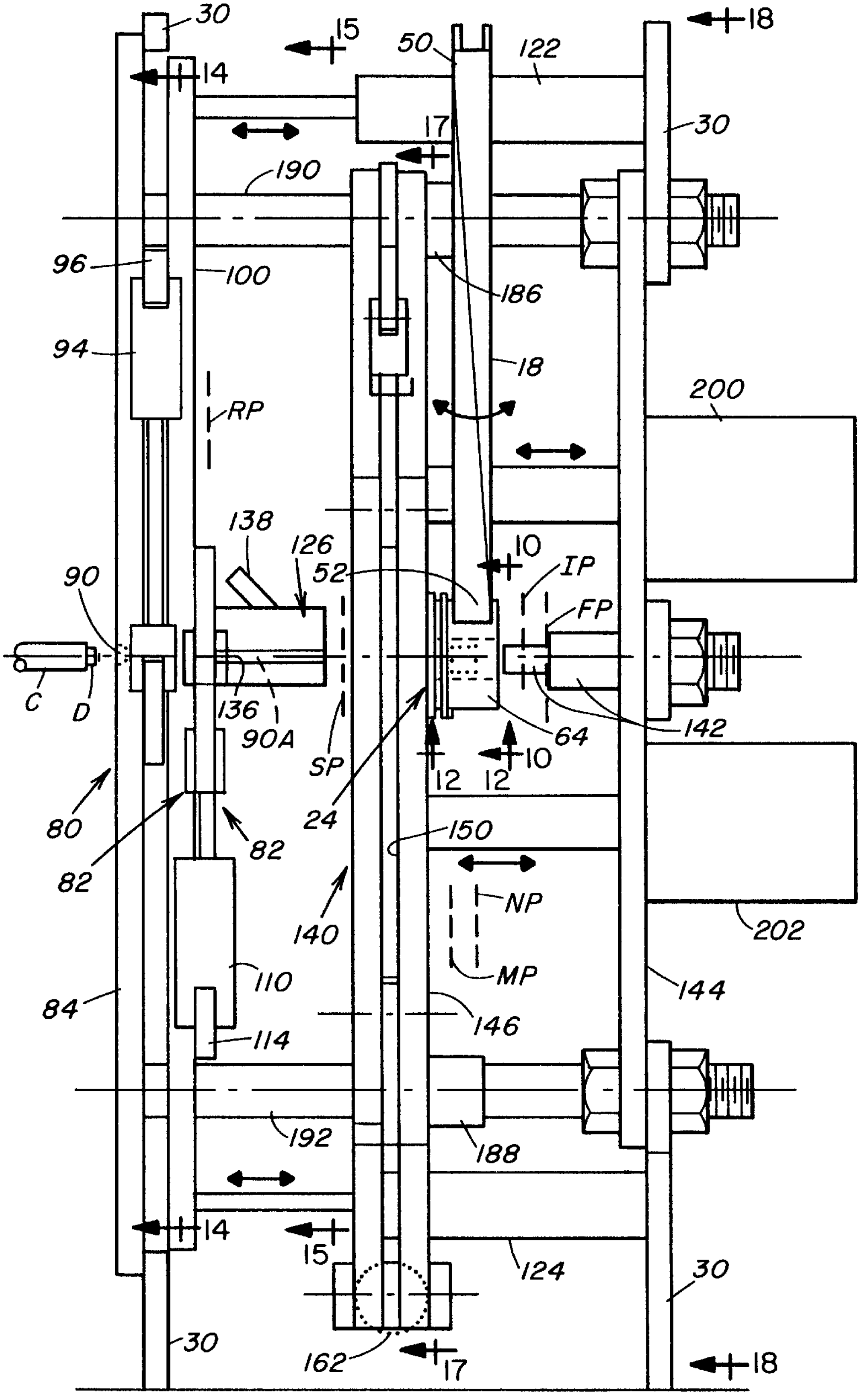
FIG. 9 is a top plan view of a first embodiment of a connector and cable end transfer and crimper apparatus of the crimping machine of FIG. 1.
Figure 11:
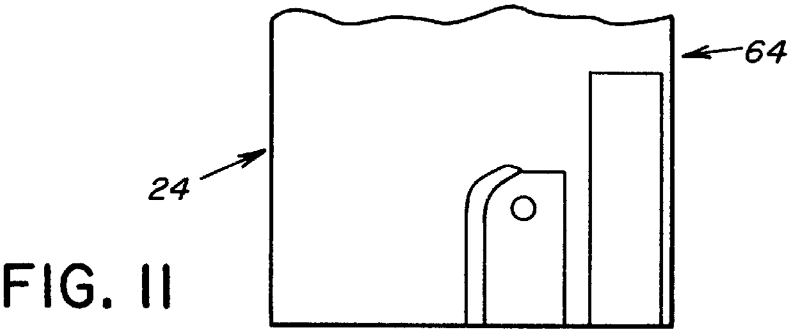
FIG. 11 is a top plan view of the connector transfer mechanism as seen along line 11—11 of FIG. 10.
Figure 10:
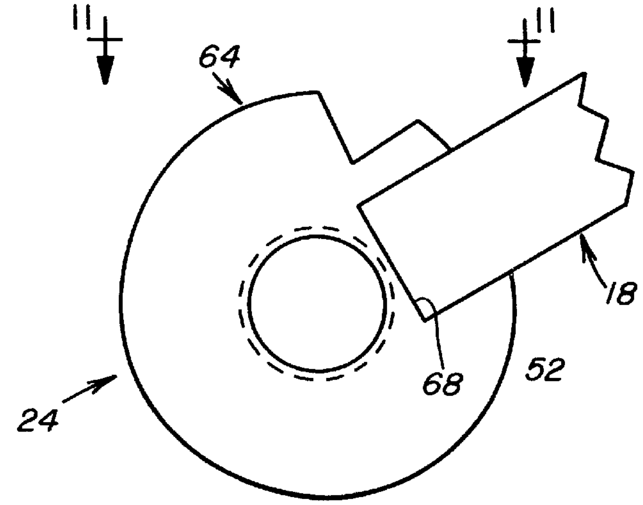
FIG. 10 is an enlarged rear end elevational view of a connector transfer mechanism of the transfer and crimper apparatus as seen along line 10—10 of FIG. 9.
Figure 14:
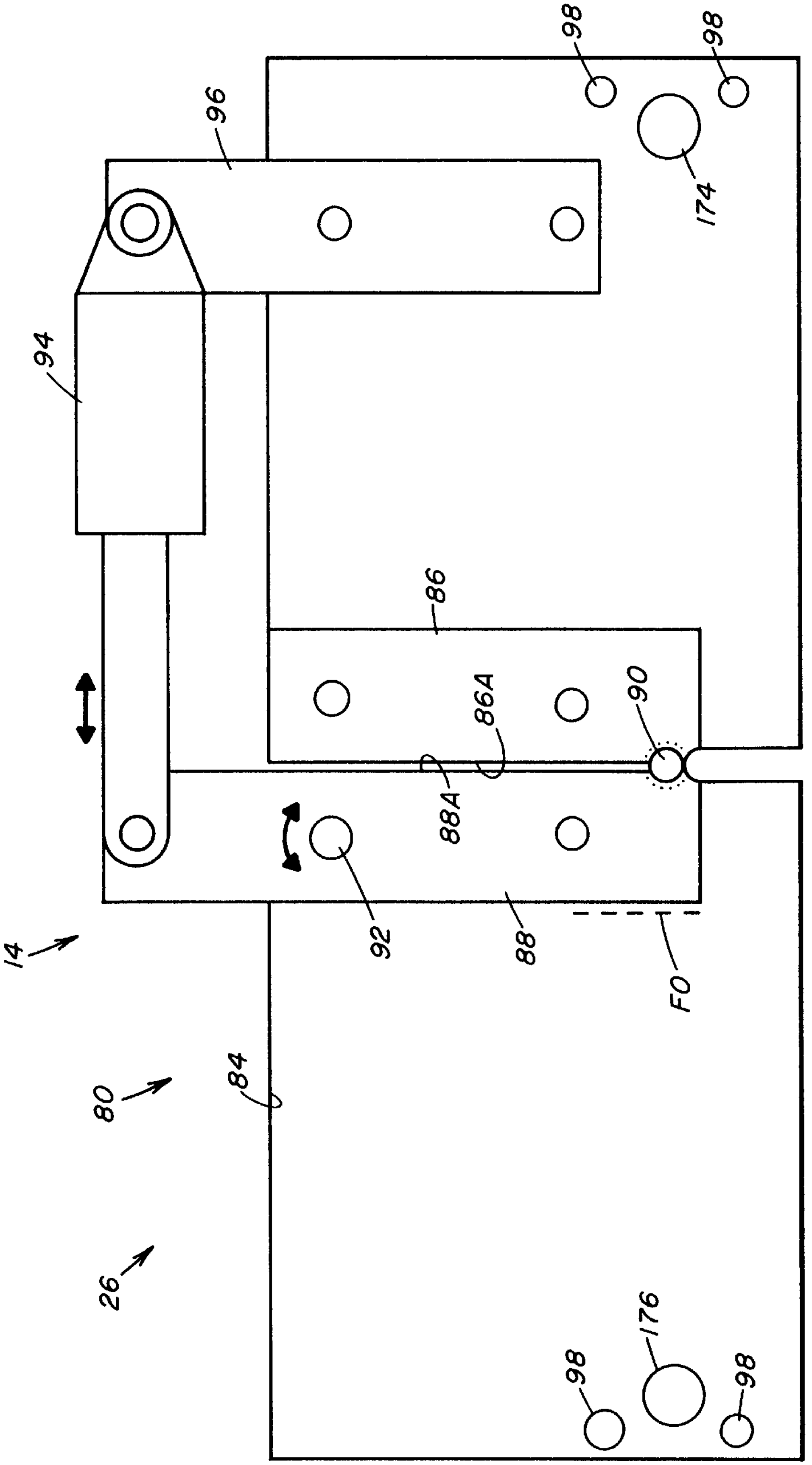
FIG. 14 is a rear elevational view of a guide and gripper assembly of the transfer and crimper apparatus as seen along line 14—14 of FIG. 9.

Referring to FIGS. 9 and 14, the guide and gripper assembly 80 of the cable transfer mechanism 26 has a main plate 84 and a first set of right and left gripper jaws 86, 88 (as viewed in FIG. 14), one pivotally movable relative to the other and both mounted adjacent to one another on the main plate 84. The main plate 84 and right and left gripper jaws 86, 88 at their lower ends and adjacent parallel edges 86A, 88A together form a cable insertion hole 90 through which cable ends D are inserted by the operator in a repetitive one at a time manner.

The right gripper jaw 86 is fixedly mounted on the main plate 84 whereas the left gripper jaw 88 is mounted to the main plate 84 adjacent to the right gripper jaw 86 for undergoing pivotal movement about pivot 92 toward and away from the right gripper jaw 86. Specifically, the first set of right and left gripper jaws 86, 88 are mounted to undergo relative pivotal movement between an open position as indicated by dashed line FO in FIG. 14 in which a cable end D is movable through the hole 90 and a closed gripping position as shown in full line form in FIG. 14 in which a cable end is gripped and held in a stationary position.

The movable left gripper jaw 88 is moved by activation of an actuation cylinder 94 extending between and pivotally coupled at respective opposite ends to a support 96 mounted upright to the main plate 84 and an upper end of the movable left gripper jaw 88. The cylinder 94 may be any suitable extendable and retractable type activated by a suitable fluid under pressure, such as a pneumatic or hydraulic cylinder, or can be a suitable mechanical or electrical actuator. The main plate 84 has pairs of holes 98 formed therein for bolting it between the portions of the frame 30.

Figures 15, 16:
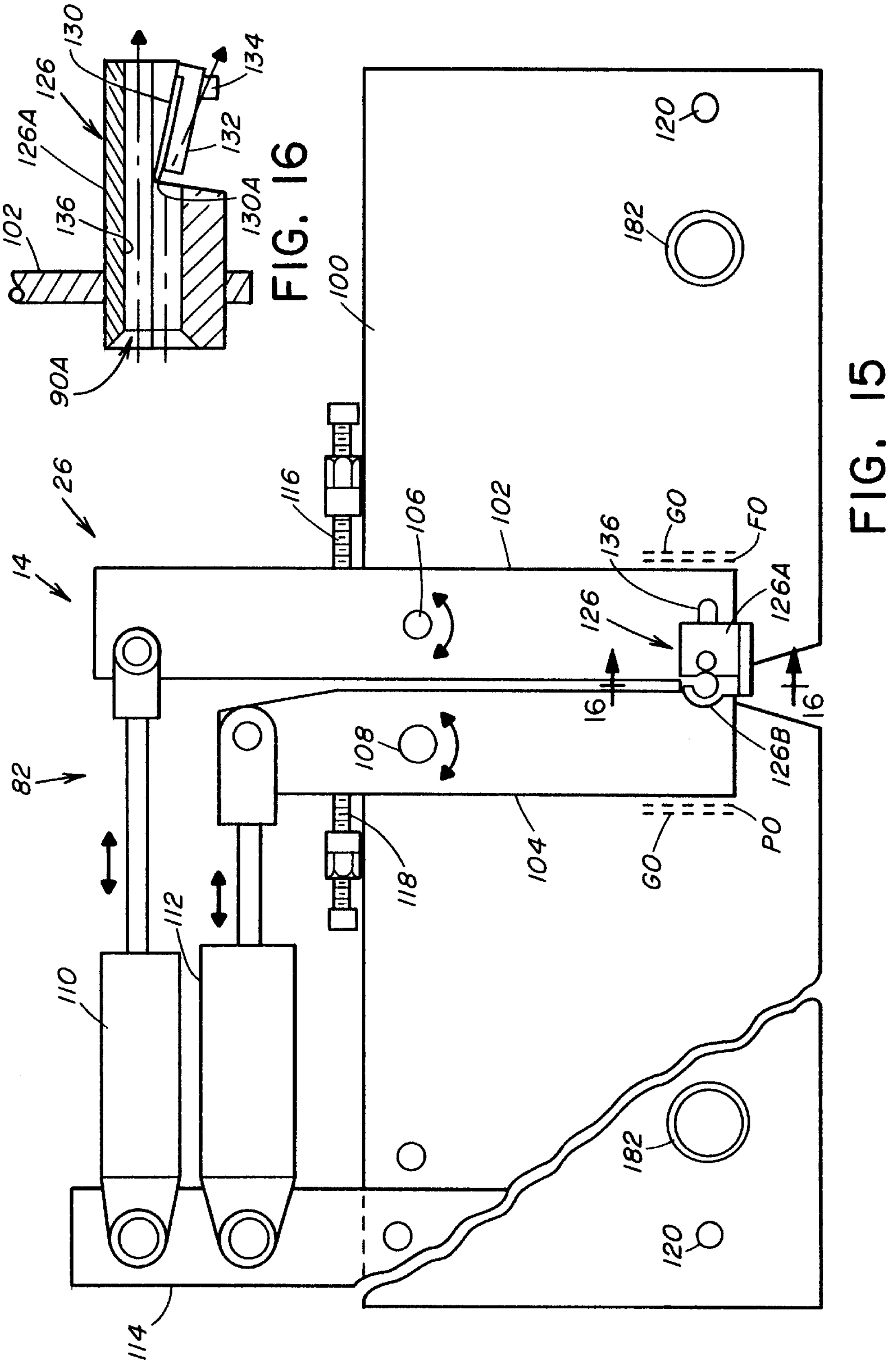
FIG. 15 is a rear elevational view of a grip and glide assembly of the transfer and crimper apparatus as seen along line 15—15 of FIG. 9.
FIG. 16 is an enlarged axial sectional view of a guide and stripper member of the grip and glide assembly taken along line 16—16 of FIG. 15.

Referring to FIGS. 9 and 15, the grip and glide assembly 82 of the cable transfer mechanism 26 is disposed between the guide and gripper assembly 80 and the crimper die mechanism 28 and movable toward the guide and gripper assembly 80 as it moves away from the crimper die mechanism 28 and vice versa. The grip and glide assembly 82 has a main plate 100, a second set of right and left gripper jaws 102, 104 (as viewed in FIG. 15), a pair of pivots 106, 108, a set of upper and lower actuation cylinders 110, 112, a support 114 and a set of adjustable right and left stops 116, 118 for the right and left gripper jaws 102, 104. The main plate 100 and right and left gripper jaws 102, 104 (as viewed in FIG. 15) at their lower ends and adjacent parallel edges 102A, 104A together form an extension 90A of the cable insertion hole 90 through which cable ends D are inserted by the operator in a repetitive one at a time manner. The right and left gripper jaws 102, 104 are both pivotally mounted to the main plate 100 adjacent to one another for undergoing pivotal movement about respective pivots 104, 106 toward and away from one another between a full open position as indicated by dashed line GO in FIG. 15, a partially open position as indicated by dashed line PO in FIG. 15 in which a cable end D is movable through the extension of the insertion hole 90 through the assembly 82, and a closed gripping position as shown in full line form in FIG. 15 in which the inserted cable end is gripped and can be moved by the assembly 82 toward and into a connector gripped by the crimper die mechanism 28. The movable right and left gripper jaws 102, 104 are moved by activation of upper and lower actuation cylinders 110, 112 extending between and pivotally coupled at opposite ends to the support 114 mounted upright to the main plate 100 and to respective upper ends of the movable right and left gripper jaws 102, 104. The adjustable right and left stops 116, 118, which are mounted on the upper edge of the main plate 110 adjacent to their respective right and left gripper jaws 102, 104, can be set to permit a small precise movement of left gripper jaw 104 to allow pushing in a cable end while still maintaining a definite insertion path and a larger movement of the right gripper jaw 102 to allow the cable end to be dropped out of the assembly 82 after crimping is finished.

The main plate 100 has a pair of holes 120 for anchoring forward ends of a right and left actuation cylinders 122, 124 which are mounted at opposite ends to the rear portions of the frame 30. When activated the cylinders 122, 124 move the grip and glide assembly 82 toward and away from the guide and gripper assembly 80 between an initial position, as shown in full line form in FIG. 9, to a rearward position, as indicated by the dashed line RP in FIG. 9, whereas activation of the upper and lower actuation cylinders 110, 112 causes the opening and closing of the right and left gripper jaws 102, 104. The cylinders 102, 122, 124 may be any suitable extendable and retractable type activated by a suitable fluid under pressure, such as a pneumatic or hydraulic cylinder, or can be suitable mechanical or electrical actuators.

Referring to FIGS. 9 and 16, there is shown a split housing 126 having complementary adjacent portions 126A, 126B mounted respectively on the rear side of the right and left gripper jaws 102, 104 about the extension 90A of the insertion hole 90 defined therethrough, the housing 126 projecting rearwardly toward the crimper die mechanism 28. The right portion 126A of the split housing 126 defines a ramp 128 and has a stripper blade 130 attached thereon in an inclined position by a clamp plate 132 and bolt 134. The portions 126A, 126B of the split housing 126 together form a passage 136 leading past the front edge 130A of the stripper blade 130. The passage 136 is large enough to permit passage of a single cable end past the blade 130 without contacting it but will direct a ground conductor portion attached to the cable end, or a second attached cable portion in the case of a siamese cable, into contact with the stripper blade 130 in order to strip away the latter portion from the cable end that is intended to receive the connector so that the stripped portion will not come in contact with the crimper die mechanism 28. Thus, the split housing 126 and the stripper blade 130 are provided to adapt the crimping machine 10 to accommodate the application of connectors to a variety of types of cables. Also, a suitable detector 138, such as an infrared sensor, is mounted to the right portion 126A of the split housing 126 so as to sense the emergence of the inserted cable end from the rear end of the passage 136 defined through the split housing 126 to signal the controller 34 to start an operative cycle of the crimping machine 10 leading to crimping of a connector onto the cable end. When the grip and glide assembly 82 moves toward and away from the guide and gripper assembly 80 between the full-line initial position to the rearward position RP, the split housing 126 is carried therewith between the full-line initial position shown in FIG. 9 to the rearward position indicated by dashed line SP shown in FIG. 9.

Crimper Die Mechanism

Figure 17:
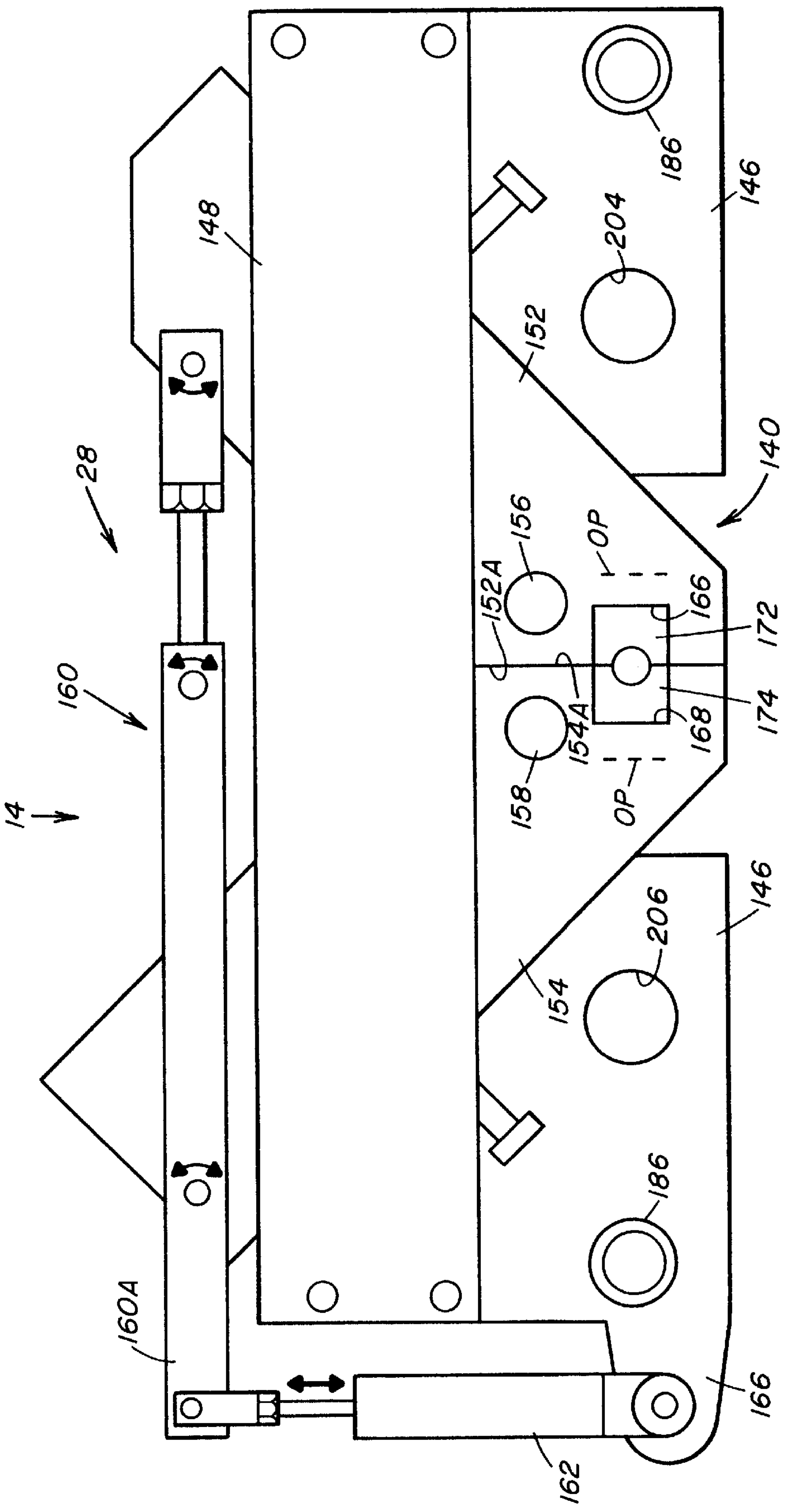
FIG. 17 is a rear elevational view of a crimper die mechanism of the transfer and crimper apparatus as seen along line 17—17 of FIG. 9.
Figure 18:
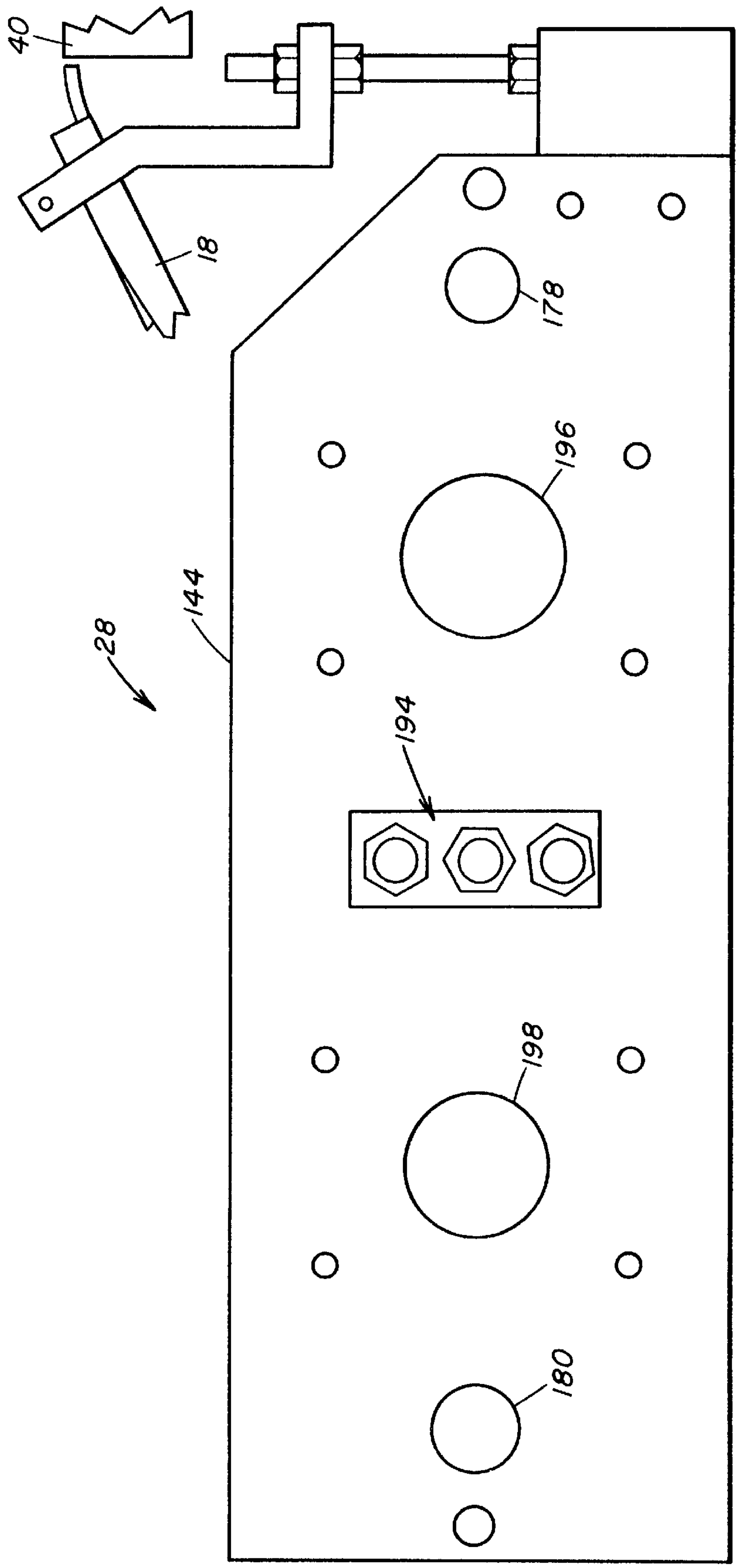
FIG. 18 is a rear elevational view of a mounting plate of a frame of the crimping machine as seen along line 18—18 of FIG. 9.

Referring to FIGS. 9, 17 and 18, there is illustrated in detail the crimper die mechanism 28 of the transfer and crimper apparatus 14 of the crimping machine 10. The crimper die mechanism 28 is operable in a repetitive one at a time manner to crimp sleeve ends B of connectors A onto the inserted ends D of cables C to form substantially uniform round sealed connections with the cable ends. The crimper die mechanism 28 includes a die jaw assembly 140, an anvil 142 and an axial force mounting plate 144. The mounting plate 144 extends between and is attached to rear portions of the frame 30. The die jaw assembly 140 is disposed between the anvil 142 supported on the mounting plate 144 and the grip and glide assembly 82 of the cable transfer mechanism 26. The die jaw assembly 140 and anvil 142 of the crimper die mechanism 28 and the body 64 and chuck means 70 of the connector transfer mechanism 24 cooperate to properly transfer, position and crimp the female sleeve end B of a connector A onto the male end D of a cable C and thereafter cause release of the crimped connector A from the body 64 and chuck means 70 and die jaw assembly 140.

Referring to FIGS. 9 and 17, the die jaw assembly 140 of the crimper die mechanism 28 includes a frame 146 and support member 148 attached to and spaced rearwardly from the frame 146 so as to define a clearance 150 therebetween. The die jaw assembly 140 also includes a set of right and left arms 152, 154 extending through the clearance 150 and mounted to the frame 146 to undergo pivotal movement relative to one another and the frame 146 about respective pivots 156, 158 on the frame 146. The upper ends of the right and left arms 152, 154 are pivotally coupled together by a toggle linkage 160 and an actuation cylinder 162 which extends between and pivotally interconnects the left end 160A of the toggle linkage 160 and a lug 164 extending from the left side of the frame 146. The right and left arms 152, 154 in their lower ends located below the pivots 156, 158 have respective notches 166, 168 formed therein which open at the adjacent edges 152A, 154A of the arms 152, 154 and a set of crimping die halves 170, 172 are respectively seated within the notches 166, 168. Because of the coupling arrangement between the upper ends of the arms 152, 154 provided by the toggle linkage 160, contraction of the cylinder 162 causes the upper ends of the arms 152, 154 to move toward one another and corresponding the lower ends of the arms 152, 154 below the pivots 156, 158 to move away from one another. The movement of the lower ends of the arms 152, 154 away from one another moves the crimping die halves 170, 172 to an open position, as represented by dashed lines OP in FIG. 17. Conversely, extension of the cylinder 162 moves the crimping die halves 170, 172 to a closed position as shown in full line form in FIG. 17. In the closed position, the crimping die halves 170, 170 together form a tapered cavity having per se the same configuration as that shown in U.S. Pat. No. 5,392,508, the disclosure of said patent being herein incorporated by reference thereto.

Holes 174, 176 and 178, 180 are provided in the main plate 84 of the guide and gripper assembly 80 and the axial force mounting plate 144 of the crimper die mechanism 28 and are aligned with linear bearings 182, 184 and 186, 188 mounted in the main plate 100 of the grip and glide assembly 82 and the frame 146 of the crimper die mechanism 28. The main plate 100 of the grip and glide assembly 82 and the frame 146 of the crimper die mechanism 28 at the respective bearings 182, 184 and 186, 188 thereof are received over right and left elongated guide rods 190, 192. The guide rods 190, 192 are secured at forward ends to the main plate 84 of the guide and gripper assembly 80 at the locations of holes 174, 176 therein and are secured at rearward ends to the axial force mounting plate 144 of the crimper die mechanism 28 at the locations of holes 178, 180 therein. Thus, both the grip and glide assembly 82 and the die jaw assembly 140 are slidably movable along the guide rods 190, 192.

Referring to FIGS. 9 and 18, the anvil 142 is mounted to the front side of the plate 144 by a fastening arrangement 194 located at the rear side of the plate 144 which can be adjusted to position the anvil 142 in alignment with the crimping die halves 170, 172 and the cable insertion hole 90 and extension 90A defined in the cable transfer mechanism 26. The axial force mounting plate 144 has holes 196, 198 which mount right and left actuation cylinders 200, 202 which, in turn, are connected at front ends to the frame 146 of the die jaw assembly 140 at the locations of holes 204, 206 therein. The cylinders 200, 202 are activated, first, to move the die jaw assembly 140 rearwardly along the guide rods 190, 192 from an initial rest position shown in full line form in FIG. 9 to a first rearwardly-displaced position indicated by dashed line MP in FIG. 9, which moves the body 64 to the initial position IP, transferring the connector A into position for crimping the connector to the cable end, and, second, to move the die jaw assembly 140 rearwardly to a second rearwardly-displaced position indicated by dashed line NP in FIG. 9, which moves the body 64 to the final position FP, releasing the crimped connector from the body 64 and die jaw assembly 140. Any tensile and compression forces are contained by the guide rods 200, 202 which are connected to axial force mounting plate 144. The rear ends of the cylinders 122, 124, which are provided to move the grip and glide assembly 82, are also mounted to the axial force mounting plate 144 at the locations of the holes 208, 210 therein. The cylinders 162, 200, 202 may be any suitable extendable and retractable type activated by a suitable fluid under pressure, such as a pneumatic or hydraulic cylinder, or can be suitable mechanical or electrical actuator.

Operation

As described earlier, the feeder bowl 16 supplies connectors C in single file repetitive one at a time manner to the feeder slide 18 where they slide down to the feed chamber 66 in the body 64 of the connector transfer mechanism 24. The die jaw assembly 140 is moved toward the anvil 142 to position MP carrying the body 64 of the connector transfer mechanism 24 therewith to position IP to bring the connector A located within the feed chamber 66 of the body 64 into engagement with the anvil 142. Such engagement is just sufficient to move the connector A relative the body 64 into engagement within the chuck means 70 of the transfer mechanism 24 which centers it at a position for subsequent crimping on the cable end. The pivot coupling of the feed slide 18 with the connector transfer mechanism 24 allow the slide 18 to swingably move with and relative to the connector transfer mechanism 24 and frame 146 of the die jaw assembly 140 which carries the cylindrical body 64 of the connector transfer mechanism 24.

A crimping operation is initiated by inserting the cable end D into the insertion hole 90 of the guide and gripper assembly 80 and passing the cable end D through an extension hole 90A of the partially open grip and glide assembly 82 where the cable end is properly prepared, if necessary, by stripping a ground conductor therefrom. When the cable end D reaches the rearward insertion location sensed by the detector 138 (seen in FIGS. 9 and 15), the grip and glide assembly 82 closes and starts the crimping operation. The grip and glide assembly 82 of the cable transfer mechanism 26 has to undergo two reciprocatory cycles for each crimping operation in order to, first, grip and move the cable end D partially within the sleeve end B of the connector A, and, second, return and grip the cable again and move it fully within the sleeve end B of the connector A. The guide and gripper assembly 80 grips and holds the cable in place during the interval that the grip and glide assembly 82 releases the cable after its first reciprocatory cycle in order to move forwardly toward the assembly 80 and relative to the cable to return to the start position of its second reciprocatory cycle. When the grip and glide assembly 82 reaches position RP at the end of its second rearward stroke, the cable end is fully inserted into the sleeve end of the connector C which is engaged against the anvil 142. Then the gripper jaws 102, 104 of the grip and glide assembly 82 are opened so that the grip and glide assembly 82 can be moved forwardly out of the way of the crimping die halves 170, 172 which are then closed in preparation for crimping. The die jaw assembly 140 is then moved again rearwardly toward the anvil 142 to the final position NP causing the axially-directed crimping of the sleeve end of the connector on the cable end by the tapered crimping die halves 170, 172. The mechanisms 26, 28 are then opened to let the cable C with the connector A crimped thereto release and drop from the crimping machine 10. Then, the gripper jaws 102, 104 of the assembly 82 are moved to the partially open position PO (for example, within about 0.020 inch of being closed) as seen in FIG. 15. This leaves the passage 136 in the housing 126 in a condition to guide the next cable end D into the crimping machine 10.

It will be readily understood that the controller 34 produces signals to the vibratory feed bowl 16 to control feeding of connectors to the transfer and crimper apparatus 14 and to the valve bank 32 which operates the various cylinders to perform various aforementioned transfer and crimping functions of the assemblies 80, 82, 140.

Modified Second Embodiment

Figure 19:
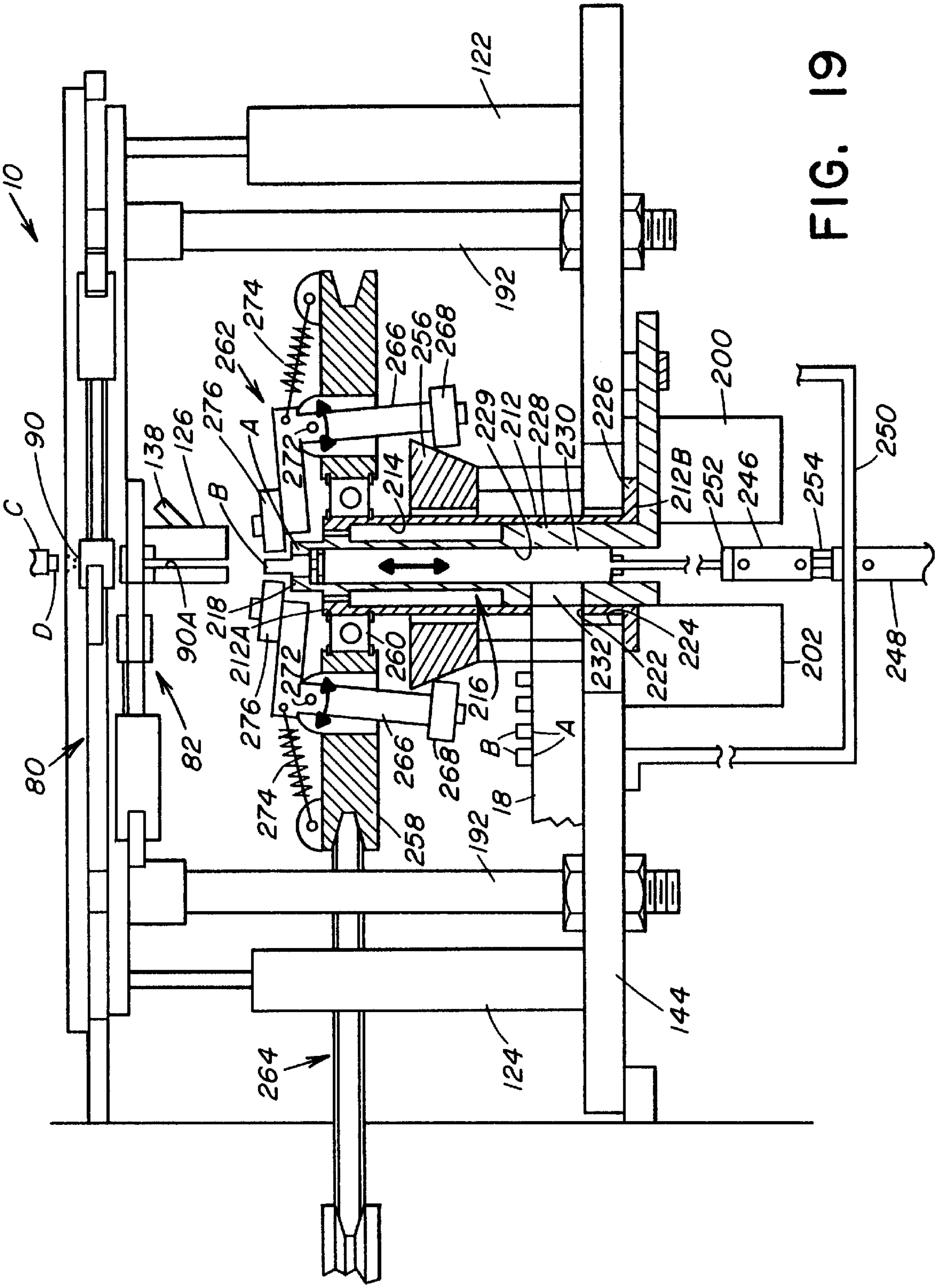
FIG. 19 is a top plan view of a modified second embodiment of the connector transfer mechanism and crimper die mechanism of the transfer and crimper apparatus for use in the crimping machine of FIG. 1.
Figure 20:
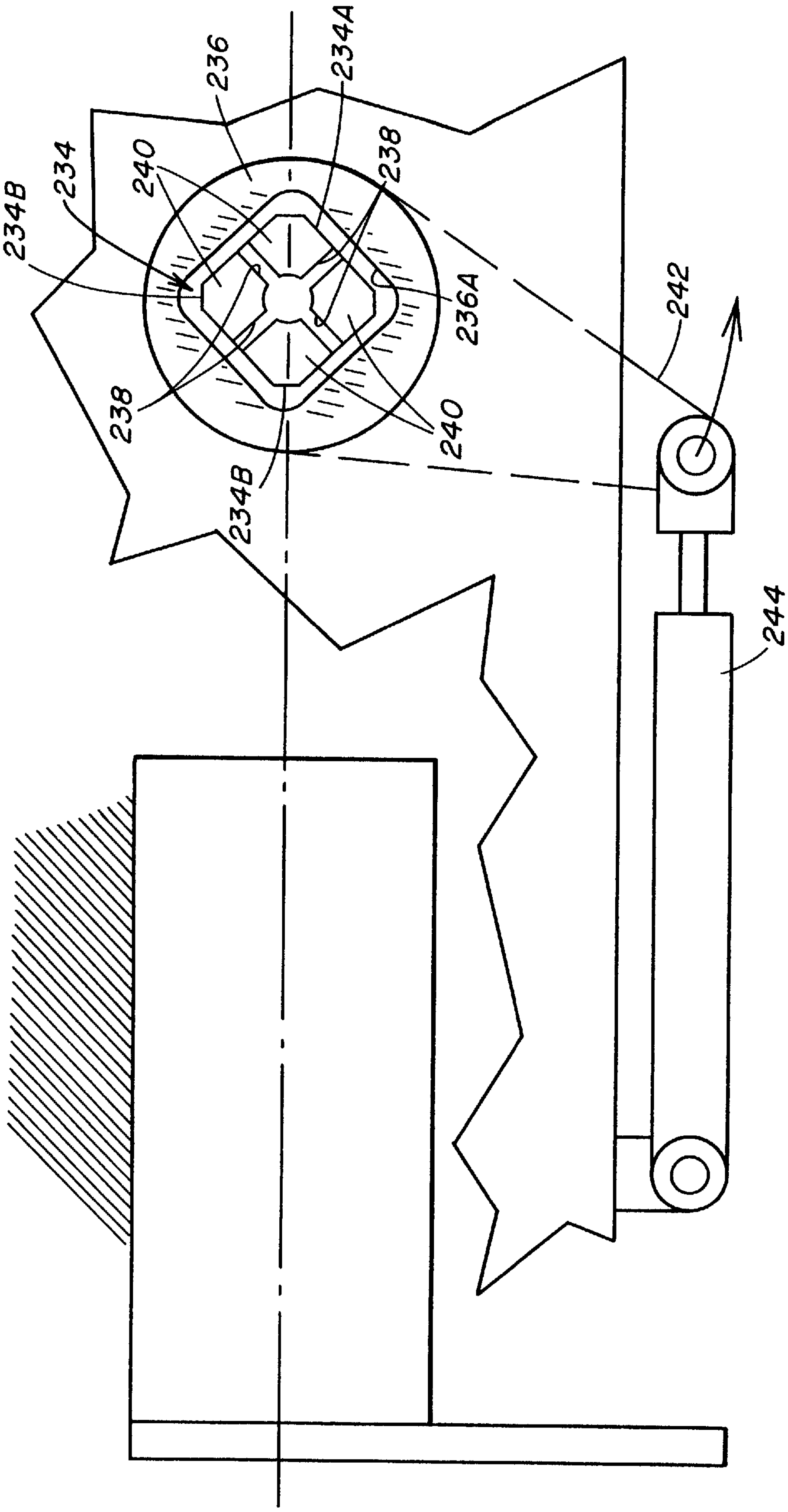
FIG. 20 is an enlarged fragmentary view of the modified embodiment of the connector transfer mechanism of the transfer and crimper apparatus of FIG. 19.

Referring to FIGS. 19 and 20, there is illustrated a modified embodiment of the crimping machine 10. Only the components of the machine 10 which are different or modified from those components shown in FIGS. 2–18 and described previously will now be described in detail with reference to FIGS. 19 and 20. The modified components are ones forming the connector transfer mechanism 24 and the crimper die mechanism 28 of the transfer and crimper apparatus 12.

The modified connector transfer mechanism 24 of the transfer and crimper apparatus 12 includes an elongated hollow cylindrical body 212 having an interior feed chamber 214 extending therethrough between front and rear ends 212A, 212B of the body 212, an elongated chuck means 216 mounted within the interior chamber 214 of the outer body 212 and having a front gripping portion 218 movable radially between expanded and contracted positions, and actuation means 220 for moving the front gripping portion 218 of the chuck means 216 between the expanded and contracted positions. The elongated body 212 also has a side entrance 222 extending into the body 212 from its exterior surface 212C to the interior chamber 214 with the discharge end 52 of the tubular feed slide 18 disposed in the side entrance 222 of the body for discharging connectors A in a repetitive one at a time manner to the transfer location within the interior chamber 214 of the body 212. The body 212 extends through a large opening 224 in the axial force mounting plate 144 and has a rear flange 226 by which the body 212 is fixedly mounted to the mounting plate 144.

The chuck means 216 of the modified connector transfer mechanism 24 includes an elongated hollow outer tubular chuck 228 extending through and rotatably mounted in the interior feed chamber 214 of the body 212 and an elongated inner ram 230 slidably mounted within a central bore 229 of the outer chuck 228. The outer chuck 228 of the chuck means 216 has a side opening 232 alignable with the side entrance 222 to the body 212 to receive connectors in a repetitive one at a time manner into the outer chuck 228. The outer chuck 228 has a forward end 234 which is substantially square in cross-section that fits within a forward portion 236 of the interior feed chamber 214 of the body 212. The interior of the forward portion 236 of the body 212 is also square in cross-sectional shape with its interior flat surface portions 236A radially spaced outwardly from the corresponding exterior flat surface portions 234A on the forward end 234 of the outer chuck 228. The forward end 234 of the outer chuck 228 has a plurality of axially and radially extending and circumferentially spaced slots 238 which divide the forward end 234 of the outer chuck 228 into segments 240 that constitute the gripping portion 218 of the chuck means 216. The segments 240 are forceably moved from a normal expanded position to a contracted position when rotation of the outer chuck 228 relative to the body 212 brings the corners 234B of the forward end 234 of the outer chuck 228 into contact with the interior flat surface portions 236A of the forward portion 236 of the body 212. When moved to the contracted position, the front segments 240 of the outer chuck 228 grip and hold the connector A in the crimp orientation aligned with the inserted cable end in preparation for being crimped thereon. Conversely, reverse rotation of the outer chuck 228 allows the segments 240 to return to the expanded position and release the connector after the connector is crimped on the cable end.

The actuation means 220 of the modified connector transfer mechanism 24 includes an arm 242 connected to the rear end of the outer chuck 228 and extending radially outwardly therefrom and an actuation cylinder 244 pivotally coupled at one end to the mounting plate 144 and at the opposite end to the outer end of the arm 242. Extension and retraction of the cylinder 244 rotates the outer chuck 228 relative the body 212 to cause the aforementioned movements of the gripping segments 240 of the outer chuck 228 between the contracted and expanded positions to correspondingly hold and release connectors that are transferred thereto in the repetitive one at a time manner.

The inner ram 230 of the chuck means 216 is slidably mounted in the central bore 229 of the outer chuck 228 for undergoing movement relative therethrough past its side opening 232 to transfer connectors A in a repetitive one at a time manner to the forward gripping segments 240 of the outer chuck 228. When the inner ram 230 is retracted rearwardly, a connector can be received into the bore 229 of the outer chuck 228. The extension of inner ram 230 forwardly transfers the connector to the gripping segments 240 of the outer chuck 228. A tandem arrangement of cylinders 246, 248 are connected to the inner ram 230 for driving it on its forward and return strokes. While two cylinders 246, 248 are shown they could be integrated into one unit. A frame member 250 connected to the mounting plate 144 supports the tandem cylinders 246, 248. Spacers 252, 254 are provided to set the length of stroke of the cylinders 246, 248. The cylinders 244, 246, 248 may be any suitable extendable and retractable type activated by a suitable fluid under pressure, such as a pneumatic or hydraulic cylinder, or can be suitable mechanical or electrical actuator.

Referring again to FIG. 19, the modified crimper die mechanism 28 of the transfer and crimper apparatus 12 now includes a tapered collar 256 surrounding the body 212 and attached to the front ends of the right and left cylinders 200, 202 used in the first embodiment to move the die jaw assembly 140. Now the cylinders 200, 202 are used to move the tapered collar 256 between a forward position as shown in full line form in FIG. 19 and a rearward position indicated by dashed line TP in FIG. 19.

The modified crimper die mechanism 28 also includes a sheave or pulley 258 rotatably mounted by an annular bearing 260 about the exterior of the forward portion 236 of the body 212, a roller assembly 262 movable between crimping and non-crimping positions, and a drive train 264 drivingly coupled to the pulley 258 to rotate the same. The roller assembly 262 is composed of a plurality of angular arms 266, rollers 268 rotatably mounted at rear ends of the arms 266, and crimping rollers 270 rotatably mounted at forward ends of the arms 266. The angular arms 266 extend through the pulley 258 and are pivotally mounted thereto at pivots 272 at circumferentially spaced locations about the pulley 258. The roller assembly 262 is rotated when the pulley 258 is rotated by the drive train 264.

When the gripping segments 240 of the outer chuck 228 are actuated to grip and hold a connector in the crimp position, the cylinders 200, 202 are retracted causing rearward movement of the tapered collar 256 engaging the rollers 268 to force the rear ends of the arms 266 outwardly and the forward ends of the arms 266 inwardly the crimping rollers 270 are thus brought into crimping contact with the sleeve end B of the connector A. Rotation of the pulley 258 cause the arms 266 and the crimping rollers 270 therewith to rotate about the connector A and crimp its sleeve end B onto the cable end D. Springs 274 connected at opposite ends to and extending between the arms 266 and the periphery of the pulley 258 cause the reverse pivoting of the arms 266 away from the connector A in response to extension of the cylinders 200, 202 and forward movement of the tapered collar 256.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A cable connection crimping machine for applying female sleeve ends of connectors over male ends of cables in repetitive one at a time manner, said machine comprising:

(a) a connector feeder mechanism operable to collect and feed connectors in a row to a transfer location, each connector having a sleeve end defining a longitudinal axis and insertable over a male end of a cable;

(b) a connector transfer mechanism disposed adjacent to said feeder mechanism and being operable in a repetitive one at time manner to receive connectors at the transfer location and arrange the connectors with sleeve ends projecting forwardly into alignment with male ends of cables inserted in a repetitive one at a time manner to an insertion location;

(c) a cable transfer mechanism disposed adjacent to said connector transfer mechanism and being operable in a repetitive one at a time manner to grip cables and advance cable ends toward and insert cable ends into sleeve ends of the connectors; and (d) a crimper die mechanism operable in a repetitive one at a time manner to crimp sleeve ends of the connectors onto the inserted cable ends to form substantially uniform round connections with the cable ends;

(e) said connector feeder mechanism including (i) a vibratory feed bowl having a central portion for receiving and collecting connectors, a peripheral portion for receiving connectors from said central portion and sorting the connectors into a given orientation, and a discharge track aligned with and extending from said peripheral portion for receiving connectors in the given orientation and arranging the connectors in a feed orientation with their sleeve ends extending downward and their longitudinal axes extending in substantially vertical orientations for discharging the connectors in a single file fashion in the feed orientation from said vibratory feed bowl, and (ii) a pressurized fluid let disposed above said discharge track of said vibratory feed bowl and operable to impinge a flow of pressurized fluid on the connectors received in said discharge track so as to ensure that the connectors assume the feed orientation in said discharge track.

2. The machine of claim 1 wherein said crimper die mechanism and cable transfer mechanism are also operable in a repetitive one at a time manner to release cable ends with connectors crimped thereon from said crimper die mechanism and cable transfer mechanism.

3. The machine of claim 1 wherein said connector feeder mechanism further includes a sensor element disposed adjacent to said discharge track of said vibratory feed bowl for sensing the accumulation of a predetermined number of connectors in said discharge track and in response thereto terminating receipt of any additional connectors by said discharge track from said peripheral portion of said vibratory feed bowl until the number of connectors in said discharge track falls below said predetermined number thereof.

4. The machine of claim 1 wherein said connector feeder mechanism further includes a tubular feed slide having an upper infeed end coupled to said discharge track of said vibratory feed bowl and a lower discharge end coupled to said connector transfer mechanism, said lower discharge end being disposed at a level spaced below that of said upper infeed end such that said tubular feed slide has an inclined orientation, said tubular feed slide being adapted to receive connectors at said infeed end in said feed orientation from said discharge track of said vibratory feed bowl, said tubular feed slide further defining a slide path adapted to rotate connectors through substantially ninety degrees as they slide down said tubular feed slide from said upper infeed end to said lower discharge end so that the connectors arrive at said transfer location in a crimp orientation with their sleeve ends projecting forwardly toward said cable ends and their longitudinal axes extending in substantially horizontal orientation.

5. The machine of claim 1 wherein said connector transfer mechanism includes:

a body having an interior chamber extending therethrough between front and rear ends of said body, a side entrance extending into said body from an exterior surface to said interior chamber, said discharge end of said tubular feed slide being disposed in said side entrance of said body for discharging connectors in a repetitive one at a time manner to the transfer location within said interior chamber of said body; and chuck means on said body for engaging connectors in said interior chamber in a repetitive one at a time manner, said chuck means having a gripping portion movable between contracted and expanded positions relative to the connectors to hold the connectors within said interior chamber of said body in the crimp orientation aligned with the cable ends in preparation for being crimped thereto and to release the connectors from said interior chamber of said body after being crimped over the cable ends.

6. A cable connection crimping machine for applying female sleeve ends of connectors over male ends of cables in repetitive one at a time manner, said machine comprising:

(a) a connector feeder mechanism operable to collect and feed connectors in a row to a transfer location, each connector having a sleeve end defining a longitudinal axis and insertable over a male end of a cable;

(b) a connector transfer mechanism disposed adjacent to said feeder mechanism and being operable in a repetitive one at a time manner to receive connectors at the transfer location and arrange the connectors with sleeve ends projecting forwardly into alignment with male ends of cables inserted in a repetitive one at a time manner to an insertion location;

(c) a cable transfer mechanism disposed adjacent to said connector transfer mechanism and being operable in a repetitive one at a time manner to grip cables and advance cable ends toward and insert cable ends into sleeve ends of the connectors; and (d) a crimper die mechanism operable in a repetitive one at a time manner to crimp sleeve ends of the connectors onto the inserted cable ends to form substantially uniform round connections with the cable ends;

(e) said connector transfer mechanism including (i) a body having an interior chamber extending therethrough between front and rear ends of said body, a side entrance extending into said body from an exterior surface to said interior chamber, said discharge end of said tubular feed slide being disposed in said side entrance of said body for discharging connectors in a repetitive one at a time manner to the transfer location within said interior chamber of said body, and (ii) chuck means on said body for engaging connectors in said interior chamber in a repetitive one at a time manner, said chuck means having a gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(f) said crimper die mechanism including (i) a pulley rotatably mounted about said body, (ii) a tapered collar slidably mounted about said body toward and away from said pulley, and (iii) a roller assembly mounted to said pulley and movable between crimping and non-crimping positions relative to a connector, said roller assembly including a plurality of arms, an actuating roller rotatably mounted at a rear end of each of said arms, a crimping roller rotatably mounted at a forward end of each of said arms and springs extending between said pulley and said arms so as to urge roller assembly away from said crimping position with said crimping rollers contacting the connector and toward said non-crimping position with said crimping rollers spaced from the connector and said actuating rollers forced against said tapered collar such that rotation of said pulley and selected axial movement of said tapered collar causes movement of said roller assembly between said crimping and non-crimping positions.

7. The machine of claim 6 wherein said connector feeder mechanism includes a vibratory feed bowl having a central portion for receiving and collecting connectors, a peripheral portion for receiving connectors from said central portion and sorting the connectors into a given orientation, and a discharge track aligned with and extending from said peripheral portion for receiving connectors in the given orientation and arranging the connectors in a feed orientation with their sleeve ends extending downward and their longitudinal axes extending in substantially vertical orientations for discharging the connectors in a single file fashion in the feed orientation from said vibratory feed bowl.

8. The machine of claim 7 wherein said connector feeder mechanism further includes a pressurized fluid jet disposed above said discharge track of said vibratory feed bowl and operable to impinge a flow of pressurized fluid on the connectors received in said discharge track so as to ensure that the connectors assume the feed orientation in said disharge track.

9. A cable connection crimping machine for applying female sleeve ends of connectors over male ends of cables in repetitive one at a time manner, said machine comprising:

(a) a connector feeder mechanism operable to collect and feed connectors in a row to a transfer location, each connector having a sleeve end defining a longitudinal axis and insertable over a male end of a cable;

(b) a connector transfer mechanism disposed adjacent to said feeder mechanism and being operable in a repetitive one at a time manner to receive connectors at the transfer location and arrange the connectors with sleeve ends projecting forwardly into alignment with male ends of cables inserted in a repetitive one at a time manner to an insertion location;

(c) a cable transfer mechanism disposed adjacent to said connector transfer mechanism and being operable in a repetitive one at a time manner to grip cables and advance cable ends toward and insert cable ends into sleeve ends of the connectors; and (d) a crimper die mechanism operable in a repetitive one at a time manner to crimp sleeve ends of the connectors onto the inserted cable ends to form substantially uniform round connections with the cable ends;

(e) said connector transfer mechanism including (i) a body having an interior chamber extending therethrough between front and rear ends of said body, a side entrance extending into said body from an exterior surface to said interior chamber, said discharge end of said tubular feed slide being disposed in said side entrance of said body for discharging connectors in a repetitive one at a time manner to the transfer location within said interior chamber of said body, and (ii) chuck means on said body for engaging connectors in said interior chamber in a repetitive one at a time manner, said chuck means having a gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(f) said chuck means including (i) a plurality of fingers slidably mounted to said body and radially aligned with said interior chamber of said body, said fingers having inner ends constituting said gripping portion, and (ii) a yieldable spring engaging said fingers and being stretchable to permit movement of said fingers away from said interior chamber to said expanded position and to urge movement of said fingers toward said interior chamber of said body to said contracted position such that inner ends of said fingers correspondingly release and hold connectors transferred thereto in a repetitive one at a time manner.

10. A cable connection crimping machine for applying female sleeve ends of connectors over male ends of cables in repetitive one at a time manner, said machine comprising:

(a) a connector feeder mechanism operable to collect and feed connectors in a row to a transfer location, each connector having a sleeve end defining a longitudinal axis and insertable over a male end of a cable;

(b) a connector transfer mechanism disposed adjacent to said feeder mechanism and being operable in a repetitive one at a time manner to receive connectors at the transfer location and arrange the connectors with sleeve ends projecting forwardly into alignment with male ends of cables inserted in a repetitive one at a time manner to an insertion location;

(c) a cable transfer mechanism disposed adjacent to said connector transfer mechanism and being operable in a repetitive one at a time manner to grip cables and advance cable ends toward and insert cable ends into sleeve ends of the connectors; and (d) a crimper die mechanism operable in a repetitive one at a time manner to crime sleeve ends of the connectors onto the inserted cable ends to form substantially uniform round connections with the cable ends;

(e) said connector transfer mechanism including (i) a body having an interior chamber extending therethrough between front and rear ends of said body, a side entrance extending into said body from an exterior surface to said interior chamber, said discharge end of said tubular feed slide being disposed in said side entrance of said body for discharging connectors in a repetitive one at a time manner to the transfer location within said interior chamber of said body, and (ii) chuck means on said body for engaging connectors in said interior chamber in a repetitive one at a time manner, said chuck means having a gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(f) said chuck means including (i) an elongated hollow outer chuck extending through said interior chamber of said body, said outer chuck having a side opening alignable with said side entrance of said body to receive connectors in a repetitive one at a time manner into said outer chuck, said outer chuck also having said gripping portion movable between said contracted and expanded positions relative to connectors to correspondingly hold and release connectors transferred thereto in a repetitive one at a time manner, and (ii) an elongated inner ram slidably mounted in said outer chuck for undergoing movement relative thereto and past said side opening of said outer chuck to transfer the connectors in a repetitive one at a time manner to said gripping portion of said outer chuck.

11. The machine of claim 10 wherein said connector transfer mechanism further includes means for rotating said outer chuck relative to said inner ram to cause movement of said gripping portion of said outer chuck between said contracted and expanded positions to correspondingly hold and release connectors transferred thereto in a repetitive one at a time manner.

12. The machine of claim 11 wherein said cable transfer mechanism includes a cable end guide and gripper assembly having a pair of gripper jaws defining a cable insertion hole through which cable ends are inserted in a repetitive one at a time manner, said gripper jaws being mounted to undergo relative pivotal movement between a full open position, a partially open position in which cable ends are received, and a closed gripping position for holding cable ends in a stationary position.

13. The machine of claim 12 wherein said crimper die mechanism includes:

an anvil spaced from and aligned with said cable insertion hole in said gripper jaws of said guide and gripper assembly; and a die jaw assembly disposed between said anvil and said guide and gripper assembly and having a pair of crimping dies adapted to undergo relative pivotal movement between open and closed positions to release and grip connectors in a repetitive one at a time manner and to undergo movement toward and away from said anvil for moving connectors with cable ends inserted therein in a repetitive one at a time manner toward said anvil to cause crimping of sleeve ends of connectors to cable ends.

14. The machine of claim 13 wherein said cable transfer mechanism also includes a grip and glide assembly disposed between the guide and gripper assembly and the die jaw assembly and movable toward the guide and gripper assembly as it moves away from the die jaw assembly and vice versa, the grip and glide assembly having a pair of gripper jaws pivotally movable relative to one another between opened and closed positions for gripping the inserted cable end and moving it toward and into a connector gripped by the die jaw assembly, said grip and glide assembly undergoing a pair of reciprocatory stroke for each crimping operation in order to first grip and then move the cable end into the connector and then to return and grip the cable again and then move it with the connector end toward the anvil and thereafter the die jaw assembly moves toward the anvil and causes crimping of connector on the cable end, the guide and gripper assembly grips and holds the cable in place as the grip and glide assembly releases the cable after the first reciprocatory stroke in order to move relative to the cable to the start of the second reciprocatory stroke.

15. An machine for applying female sleeve ends of connectors over male ends of cables in repetitive one at a time manner, said apparatus comprising:

(a) a connector transfer mechanism operable in a repetitive one at a time manner to receive connectors and move the connectors with sleeve ends projecting forwardly into a position aligned with and for crimping on male ends of cables inserted in a repetitive one at a time manner to an insertion location;

(b) a cable transfer mechanism disposed adjacent to said connector transfer mechanism and being operable in a repetitive one at a time manner to grip cables and advance cable ends toward and insert cable ends into sleeve ends of the connectors; and (c) a crimper die mechanism disposed between said connector transfer mechanism and cable transfer mechanism and being operable in a repetitive one at a time manner to crimp sleeve ends of the connectors onto the inserted cable ends to form substantially uniform round connections with the cable ends;

(d) said connector transfer mechanism including (i) a body having an interior chamber extending therethrough between front and rear ends of said body, a side entrance extending into said body from an exterior surface to said interior chamber for receiving connectors in a repetitive one at a time manner at the transfer location within said interior chamber of said body, and (ii) chuck means on said body for engaging connectors in said interior chamber in a repetitive one at a time manner, said chuck means having an gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(e) said crimper die mechanism including (i) a pulley rotatably mounted about said body, (ii) a tapered collar slidably mounted about said body toward and away from said pulley, and (iii) a roller assembly mounted to said pulley and movable between crimping and non-crimping positions relative to a connector, said roller assembly including a plurality of arms, an actuating roller rotatably mounted at a rear end of each of said arms, a crimping roller rotatably mounted at a forward end of each of said arms and springs extending between said pulley and said arms so as to urge roller assembly away from said crimping position with said crimping rollers contacting the connector and toward said non-crimping position with said crimping rollers spaced from the connector and said actuating rollers forced against said tapered collar such that rotation of said pulley and selected axial movement of said tapered collar causes movement of said roller assembly between said crimping and non-crimping positions.

16. The machine of claim 15 wherein said crimper die mechanism and cable transfer mechanism are also operable in a repetitive one at a time manner to release cable ends with connectors crimped thereon from said crimper die mechanism and cable transfer mechanism.

17. An machine for applying female sleeve ends of connectors over male ends of cables in repetitive one at a time manner, said apparatus comprising:

(a) a connector transfer mechanism operable in a repetitive one at a time manner to receive connectors and move the connectors with sleeve ends projecting forwardly into a position aligned with and for crimping on male ends of cables inserted in a repetitive one at a time manner to an insertion location;

(b) a cable transfer mechanism disposed adjacent to said connector transfer mechanism and being operable in a repetitive one at a time manner to grip cables and advance cable ends toward and insert cable ends into sleeve ends of the connectors; and (c) a crimper die mechanism disposed between said connector transfer mechanism and cable transfer mechanism and being operable in a repetitive one at a time manner to crimp sleeve ends of the connectors onto the inserted cable ends to form substantially uniform round connections with the cable ends;

(d) said connector transfer mechanism including (i) a body having an interior chamber extending therethrough between front and rear ends of said body, a side entrance extending into said body from an exterior surface to said interior chamber for receiving connectors in a repetitive one at a time manner at the transfer location within said interior chamber of said body, and (ii) chuck means on said body for engaging connectors in said interior chamber in a repetitive one at a time manner, said chuck means having an gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(e) said chuck means including (i) a plurality of fingers slidably mounted to said body and radially aligned with said interior chamber of said body, said fingers having inner ends constituting said gripping portion, and (ii) a yieldable spring engaging said fingers and being stretchable to permit movement of said fingers away from said interior chamber to said expanded position and to urge movement of said fingers toward said interior chamber of said body to said contracted position such that inner ends of said fingers correspondingly release and hold connectors transferred thereto in a repetitive one at a time manner.

18. The machine of claim 17 wherein said crimper die mechanism includes:

a pulley rotatably mounted about said body;

a tapered collar slidably mounted about said body toward and away from said pulley; and a roller assembly mounted to said pulley and movable between crimping and non-crimping positions relative to a connector, said roller assembly including a plurality of arms, an actuating roller rotatably mounted at a rear end of each of said arms, a crimping roller rotatably mounted at a forward end of each of said arms and springs extending between said pulley and said arms so as to urge roller assembly away from said crimping position with said crimping rollers contacting the connector and toward said non-crimping position with said crimping rollers spaced from the connector and said actuating rollers forced against said tapered collar such that rotation of said pulley and selected axial movement of said tapered collar causes movement of said roller assembly between said crimping and non-crimping positions.

19. An machine for applying female sleeve ends of connectors over male ends of cables in repetitive one at a time manner, said apparatus comprising:

(a) a connector transfer mechanism operable in a repetitive one at a time manner to receive connectors and move the connectors with sleeve ends projecting forwardly into a position aligned with and for crimping on male ends of cables inserted in a repetitive one at a time manner to an insertion location;

(b) a cable transfer mechanism disposed adjacent to said connector transfer mechanism and being operable in a repetitive one at a time manner to grip cables and advance cable ends toward and insert cable ends into sleeve ends of the connectors; and (c) a crimper die mechanism disposed between said connector transfer mechanism and cable transfer mechanism and being operable in a repetitive one at a time manner to crimp sleeve ends of the connectors onto the inserted cable ends to form substantially uniform round connections with the cable ends;

(d) said connector transfer mechanism including (i) a body having an interior chamber extending therethrough between front and rear ends of said body, a side entrance extending into said body from an exterior surface to said interior chamber for receiving connectors in a repetitive one at a time manner at the transfer location within said interior chamber of said body, and (ii) chuck means on said body for engaging connectors in said interior chamber in a repetitive one at a time manner, said chuck means having an gripping portion movable between contracted and expanded positions relative to the connectors to hold the connectors within said interior chamber of said body in a crimp orientation aligned with the cable ends in preparation for being crimped thereto and to release the connectors from said interior chamber of said body after being crimped over the cable ends;

(e) said chuck means including (i) an elongated hollow outer chuck extending through said interior chamber of said body, said outer chuck having a side opening alignable with said side entrance of said body to receive connectors in a repetitive one at a time manner into said outer chuck, said outer chuck also having said gripping portion movable between said contracted and expanded positions relative to connectors to correspondingly hold and release connectors transferred thereto in a repetitive one at a time manner, and (ii) an elongated inner ram slidably mounted in said outer chuck for undergoing movement relative thereto and past said side opening of said outer chuck to transfer the connectors in a repetitive one at a time manner to said gripping portion of said outer chuck.

20. The machine of claim 19 wherein said connector transfer mechanism further includes means for rotating said outer chuck relative to said inner ram to cause movement of said gripping portion of said outer chuck between said contracted and expanded positions to correspondingly hold and release connectors transferred thereto in a repetitive one at a time manner.

21. The machine of claim 20 wherein said cable transfer mechanism includes a cable end guide and gripper assembly having a pair of gripper jaws defining a cable insertion hole through which cable ends are inserted in a repetitive one at a time manner, said gripper jaws being mounted to undergo relative pivotal movement between a full open position, a partially open position in which cable ends are received, and a closed gripping position for holding cable ends in a stationary position.

22. The machine of claim 21 wherein said crimper die mechanism includes:

an anvil spaced from and aligned with said cable insertion hole in said gripper jaws of said guide and gripper assembly; and a die jaw assembly disposed between said anvil and said guide and gripper assembly and having a pair of crimping dies adapted to undergo relative pivotal movement between open and closed positions to release and grip connectors in a repetitive one at a time manner and to undergo movement toward and away from said anvil for moving connectors with cable ends inserted therein in a repetitive one at a time manner relative to said anvil to cause crimping of sleeve ends of connectors to cable ends.

23. The machine of claim 22 wherein said cable transfer mechanism also includes a grip and glide assembly disposed between the guide and gripper assembly and the die jaw assembly and movable toward the guide and gripper assembly as it moves away from the die jaw assembly and vice versa, the grip and glide assembly having a pair of gripper jaws pivotally movable relative to one another between opened and closed positions for gripping the inserted cable end and moving it toward and into a connector gripped by the die jaw assembly, said grip and glide assembly undergoing a pair of reciprocatory strokes for each crimping operation in order to first grip and then move the cable end into the connector and then to return and grip the cable again and then move it with the connector end toward the anvil and thereafter the die jaw assembly moves toward the anvil and causes crimping of connector on the cable end, the guide and gripper assembly grips and holds the cable in place as the grip and glide assembly releases the cable after the first reciprocatory stroke in order to move relative to the cable to the start of the second reciprocatory stroke.

* * * * *